United States Patent Office

3,359,622
Patented Dec. 26, 1967

3,359,622
PROCESS FOR MAKING COMPOSITE POROUS ELEMENTS
Rene Meyer and Pierre Potet, Grenoble, France, assignors to Societe des Poudres Metalliques et des Alliages Speciaux Ugine-Carbone, Paris, France, a corporation of France
No Drawing. Filed Feb. 6, 1963, Ser. No. 256,544
10 Claims. (Cl. 29—420.5)

The present invention relates to porous composite elements of sintered metals and a process for making same.

A porous element of one or more sintered metals has various applications; for example, it is frequently used as or for making filters. The usual homogeneous filtering element is made from a material or materials with characteristics and properties substantially uniform along the path of flow of the fluid or medium to be filtered, i.e., from the inlet surface of the element through to the outlet surface. For a given thickness of the filtering element, the drop in pressure of the fluid as a result of flow therethrough increases as the dimension of the pores of the element decreases. In some instances the amount of pressure drop becomes prohibitive. Of course, separation of fine foreign particles or material from the fluid requires the small size pores which effect the pressure drop.

It has been proposed to produce composite porous elements by sintering a very thin porous layer previously deposited upon a metallic part which is itself porous and already sintered and which is a support for the very thin layer. However, it is difficult to obtain good adhesion between the thin layer and its metallic support.

The present invention relates to a process for obtaining a porous element comprising at least two metallic layers, each having a given thickness and a given porosity and perfectly and strongly joined together.

The process of our invention comprises preparation of several pastes, each composed of metallic grains or particles with a substantially narrow range of granule size or granulometry and of a fugitive binder, which for each layer is suitable for the granules thereof. From the pastes a composite billet or workpiece is made and at substantially ambient temperature the billet is formed or fabricated into a product of a desired shape. Then this product is sintered on a bed of an inert powder, such as alumina.

The particles used for one layer can be a metal different from the metal of another layer but the metals must have a substantially common range of sintering temperature to effect good adherence on their surface of separation as a result of sintering.

Also, all layers can be made from grains of the same metal. However, to realize good benefits from the invention, the granulometry of grains preferably is different for each layer.

The fugitive binder is one of those usually used in the techniques for obtaining filters by sintering after extruding, drawing or rolling, for example, the paraffins, vaselines, fats, and plastic materials.

The shape of the composite billet and the techniques of fabrication or formation used to obtain the shape depend, of course, on the desired shape. For instance, for plates, one deposits one or several successive and thinner layers of other pastes on a relatively thick layer of a first paste. Then, adherence of all these layers together is effected followed by rolling the layers to a given thickness between a pair of rolls or between a single roll and a solid stationary base. Where rolling is unsatisfactory, drawing and extrusion practices have utility.

To obtain composite pipe, a billet of concentric rings is first prepared out from different pastes, followed by extruding or drawing this billet. In drawing or extruding, the inner ring can be a full core of one paste.

After forming or fabrication of the product, sintering is effected with means, techniques and at temperatures suitable therefor. For instance, the techniques of sintering described in the French Patent 1,266,497 of May 18, 1960, are satisfactory.

The porous elements obtained with the process of the invention are articles composed of two or several porous layers, each with a different porosity. The various layers may be of different or very similar thickness. The process of the invention, for instance, gives the opportunity to obtain articles composed of very thin layers, and of thicker layers, one of them supporting mechanically the thin layer or the thin layers. The thickness of the thin layers can be very small, for instance 0.1 mm. or less. The elements prepared according to the process of the invention have a perfect adherence of the layers together that compose them, an excellent homogeneity of each layer, and are free from interpenetration by the metal particles of one layer into another layer.

The process of the present invention effects preparation of porous composite elements of very various shapes, for example, plates or pipes wherein one of the exterior layers of the two exterior layers are very thin and the layer with the coarsest grains provides the mechanical strength of the article.

The elements prepared according to the process of the invention include materials with two active surfaces and different porosities, which elements have application in fuel-cells. The elements also are used as filters in which case the thin layer imparts the required filtering abilities to the element. A comparison between a conventional filter element of sintered powder and an element of the process of the invention shows that the conventional filtering homogeneous element, 2 mm. thick for filtering a gas loaded with fine dusts having a fineness under 1 micron, has a flow of 40 m.$^3$/h. per m.$^2$ with a pressure drop of 5 gf./cm.$^2$. On the other hand, the element of the process of the invention filters the same dust-laden gas and permits the same flow while sustaining a pressure drop of only 1 gf./cm.$^2$.

*Example 1*

This example relates to the production of a composite filtering article of bronze. This article has a filtering layer 0.5 mm. thick composed of grains of average dimension: 20 micron, and a support-layer 2 mm. thick composed of grains larger than 20 micron.

This article is prepared by separately mixing a first paste containing 93% by weight of bronze powder with spherical grains of granulometry ranging between 10 and 30 microns, and 7% by weight of a mixture of 40% paraffin and 60% vaseline and a second paste containing 92% by weight of bronze powder of granulometry ranging between 50 and 100 microns and 8% by weight of the same binder as that of the first paste. Then, the first and second pastes are introduced successively into the same container of square section of 75 mm. of side in quantities of paste necessary to form a composite billet composed of a layer of the fine powder, about 15 mm. thick for the width and length of the container, and of a layer of the coarser powder, 60 mm. thick for the length and width of the container. Next, the container is placed on an extrusion press inclined at 30° and provided with an extrusion plate with a rectangular port, 75 mm. wide and 2.5 mm. high.

After extrusion of this composite billet, the composite plate obtained is cut into strips 250 mm. long which are placed on stainless steel plates and covered with alumina powder and then sintered in hydrogen by slowly heating to a temperature of 725° C.

The composite filtering plate produced has a filtering layer 0.5 mm. thick supported by a porous layer of larger dimensioned grains and 2 mm. thick.

This composite plate stops particles of dimension less than 1 micron and has a permeability such that with a depression of 5 gf./cm.², there is a flow of air of 15 l./h. per cm.² of filtering surface and a resistance to the flexion of 25 kgf./mm.².

A filtering element of identical thickness composed out of the finest powder has the same filtering power but a permeability fourfold lower than the composite plate. The same element composed out of the coarsest powder has a permeability two times greater than the composite plate but a filtering capacity five times less than that of the composite plate.

*Example 2*

This example relates to production of a composite pipe of sintered nickel made from a nickel powder obtained from nickel carbonyl and composed of grains of granulometry ranging between 1 and 16 microns. This powder is separated by elutriation into two fractions, one from 1 to 5 microns, the other from 5 to 16 microns, and in amounts of one part by weight of fine powder to four parts by weight of coarser powder.

To each of the fractions is added a binder, a mixture of vaseline and paraffin, heated to a temperature which permits the grains to be intimately mixed with the binder to form a homogeneous paste of the grains and the binder. Then, we form a cylindrical billet of exterior diameter 50 mm. and of a central core of 22.4 mm. diameter which is composed of the fine powder, which is surrounded by an exterior cylindrical ring composed of the coarser powder.

There are different methods to obtain such a billet; for instance, the following one wherein into the axle of a cylindrical container of an extrusion press 50 mm. diameter, a metallic core with an exterior diameter equal to that of the required central core, then the paste obtained from the coarse powder is poured into the container around the metallic core. After cooling, the metallic core is removed and the paste obtained from fine powder is poured into the cavity and allowed to cool to form the composite billet.

Next, the composite billet is extruded through a vertical extrusion die provided with a spindle which has a 19 mm. exterior diameter and which assists to form a tube product. The extruded composite tube product has an exterior diameter 20 mm. and an inner diameter 19 mm. and whose wall is composed of an inner layer 0.1 mm. thick of the fine powder and of an exterior layer of 0.4 mm. of the coarse powder.

This composite tube product is cut into pipes 300 mm. long and then placed vertically upon an alumina bed, and sintered under hydrogen by heating slowly to a temperature of 850° C. The composite pipe or tube with the two homogeneous layers perfectly welded have different abilities of filtration.

The following table sets forth data obtained from such composite pipes and from homogeneous pipes of the same wall thickness but prepared from non-elutriated powder and from each powder resulting from elutriation.

| Composition of the Sintered Wall | Permeability in 10⁻⁸ cm.² | Largest Pores in microns |
| --- | --- | --- |
| Composite pipe of the invention composed of— a layer thick 0.1 mm. obtained from grains 1–5 microns and of a layer 0.4 mm. obtained from grains 5–16 microns | 0.20 | 2.5 |
| Homogeneous pipes— of a thickness of 0.5 mm. obtained from grains 1–16 microns | 0.35 | 9 |
| of a thickness of 0.5 mm. obtained from grains 1–5 microns | 0.05 | 2.5 |
| of a thickness of 0.5 mm. obtained from grains 5–16 microns | 0.45 | 10 |

The mentioned values of permeability are corresponding to the DARCY coefficient given by the relation:

$$p = \frac{U \cdot \eta \cdot L}{\Delta p \cdot A}$$

where:

U is the flow in volume,
A is the surface of filtration,
L is the thickness of the filtering element,
$\eta$ is the dynamic viscosity of the fluid filtered,
$\Delta p$ is the drop in pressure of the fluid flow through the filtering element.

The dimension of the largest pore is that measured by bubblescopy. From the foregoing table, with equality of dimension of pores, the permeability is fourfold greater for the composite filtering element of the process of the invention than for the homogeneous element prepared out from a powder with the same granulometry as that of the thin layer of composite product.

While we have described preferred embodiments of our invention, it may be otherwise embodied within the scope of the appended claims.

We claim:

1. A process for making a composite porous element having at least two distinct layers of different porosity adhered together, each of said layers composed of metallic grains and a binder and the granulometry of the grains in each of said layers being in different ranges, the grains in all of said layers having a substantially common range of sintering temperature, said process comprising:
   (1) preparing a first paste of metallic grains of a specified granulometry range and a fugitive binder,
   (2) preparing a second paste of metallic grains of a specified granulometry range differing from said first range and a fugitive binder,
   (3) spreading said first paste into a first self-supporting layer capable of being mechanically deformed,
   (4) disposing said second paste upon said first layer to form a second self-supporting layer capable of being mechanically deformed distinct from said first layer,
   (5) simultaneously fabricating said first and second layers at substantially ambient temperature without interpenetration of metallic grains to adhere said layers to form said composite element, and
   (6) heating said composite element at a temperature in said sintering temperature range to form a composite body having discrete zones of differing porosities corresponding to the initial layers of differing granulometry.

2. The process of claim 1 wherein said fabricating consists of rolling said two layers disposed with said second layer upon said first layer to obtain a given thickness of said two layers in said composite element.

3. The process of claim 1 characterized by one of said two layers being thinner than said other layer and having grains of finer granulometry than the granulometry of the other layer.

4. The process of claim 1 characterized by placing said composite element of said desired shape upon a bed of an inert powder before heating to said sintering temperature range.

5. The process of claim 1 characterized by said granulometry range of at least one of said two layers being narrow and not more than 50 microns.

6. The process of claim 1 characterized by said granulometry range of at least one of said two layers being narrow and not more than 20 microns.

7. The process of claim 1 characterized by said granulometry range of one of said two layers being between 1 and 5 microns.

8. The process of claim 1 characterized by placing said first layer in an extrusion container and there disposing same so that it occupies a given portion of the thickness of said container and extends lengthwise and widthwise thereof and then disposing said second layer in said extrusion container upon said first layer so that it occupies the remaining portion of said thickness of said container and extends lengthwise and widthwise thereof, and wherein said fabricating consists of extruding said two layers through a die to form said composite element in which each of said first and second layers extends lengthwise and widthwise thereof and occupies a given portion of the thickness thereof.

9. The process of claim 1 characterized by forming a composite billet comprising a given thickness of said first layer upon which is disposed a given thickness of said second layer, and wherein said fabricating consists of extruding said billet through a die to produce said composite element with each of said layers having a given thickness in said composite element.

10. The process of claim 1 characterized by disposing said first layer in an extrusion container completely around a core member located in said container to form a given thickness of said first layer therein, removing said core member and then disposing said second layer in said extrusion container in a cavity resulting from removal of said core member, and wherein said fabricating consists of extruding said two layers through a die and in said extruding using a spindle which forms a hollow composite element with said first and second elements each having a given thickness in said composite element.

References Cited

UNITED STATES PATENTS

| | | |
|---|---|---|
| 2,001,134 | 5/1935 | Hardy. |
| 2,096,924 | 10/1937 | Schwarzkopf _____ 29—420.5 X |
| 2,251,410 | 9/1941 | Koehring et al. |
| 2,267,918 | 12/1941 | Hildabout. |
| 2,341,732 | 2/1944 | Marvin _____ 75—208 |
| 3,146,099 | 8/1964 | Teja _____ 29—420 X |
| 3,247,573 | 4/1966 | Noack _____ 29—155.5 |

FOREIGN PATENTS 888,119   1/1962   Great Britain.

JOHN F. CAMPBELL, *Primary Examiner.*

WHITMORE A. WILTZ, *Examiner.*

P. M. COHEN, *Assistant Examiner.*